(12) United States Patent
Lee et al.

(10) Patent No.: US 9,151,836 B2
(45) Date of Patent: Oct. 6, 2015

(54) DETECTION AND TRACKING RADAR, ANTI HIGH SPEED MOBILE DEFENSE SYSTEM HAVING THE SAME AND HIGH SPEED MOBILE TRACKING METHOD OF DETECTION AND TRACKING RADAR

(75) Inventors: Jong-Min Lee, Daejeon (KR); Sun-gu Sun, Daejeon (KR); Byunglae Cho, Daejeon (KR); Jungsoo Lee, Daejeon (KR); Sangsoon Park, Jeonbuk (KR); Youn Sik Kang, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 545 days.

(21) Appl. No.: 13/579,149

(22) PCT Filed: Jul. 29, 2011

(86) PCT No.: PCT/KR2011/005614
§ 371 (c)(1),
(2), (4) Date: Aug. 15, 2012

(87) PCT Pub. No.: WO2012/144694
PCT Pub. Date: Oct. 26, 2012

(65) Prior Publication Data
US 2013/0027242 A1 Jan. 31, 2013

(30) Foreign Application Priority Data
Apr. 19, 2011 (KR) ........................ 10-2011-0036429

(51) Int. Cl.
*G01S 13/87* (2006.01)
*G01S 7/292* (2006.01)
(Continued)

(52) U.S. Cl.
CPC ............... *G01S 13/87* (2013.01); *G01S 7/292* (2013.01); *G01S 7/295* (2013.01); *G01S 13/726* (2013.01)

(58) Field of Classification Search
CPC ... G01S 5/0294; G01S 7/2922; G01S 7/2927; G01S 7/295; G01S 7/2955; G01S 7/41; G01S 7/414; G01S 13/5244; G01S 13/04; G01S 13/56; G01S 13/58; G01S 13/66–13/726; G01S 13/883; G01S 13/91; G01S 13/9303
USPC ............... 342/13–20, 22, 27, 28, 89–97, 104, 342/107, 109, 113, 115, 118, 123, 140, 146, 342/147, 175
See application file for complete search history.

(56) References Cited

U.S. PATENT DOCUMENTS 3,794,992 A * 2/1974 Gehman ......................... 342/28
3,833,904 A * 9/1974 Gebhardt et al. ............... 342/83
(Continued)

FOREIGN PATENT DOCUMENTS

JP 2003-167049 A 6/2003
JP 2004-309166 A 11/2004

OTHER PUBLICATIONS

Jong-Min Lee et al., "K-Band Radar Development for the Ground Moving Vehicle", The Journal of Korean Institute of Electromagnetic Engineering and Science (Mar. 2011), vol. 22, No. 3, pp. 362-370.
(Continued)

*Primary Examiner* — Peter Bythrow
(74) *Attorney, Agent, or Firm* — Scully, Scott, Murphy & Presser, P.C.

(57) ABSTRACT

A detection and tracking radar includes a hazardous zone set within a preset radius based on a main body having a radar, a plurality of detection and tracking sectors configured to detect a high speed mobile approaching the main body within detection areas, the detection areas being defined by diving the hazardous zone based on an azimuth angle, and a controller configured to recognize the high speed mobile as a target based upon signals received from the detection and tracking sectors and track the target. Accordingly, rapid detection and tracking of the high speed mobile can be allowed. Also, since the detection and tracking sectors can be independently run, expansion of a radar system can be free by virtue of addition of the detection and tracking sectors.

12 Claims, 4 Drawing Sheets

(51) Int. Cl.
*G01S 7/295* (2006.01)
*G01S 13/72* (2006.01)

(56) References Cited

U.S. PATENT DOCUMENTS

| | | | |
|---|---|---|---|
| 3,938,149 A * | 2/1976 | Grantham | 342/94 |
| 3,956,748 A * | 5/1976 | Rymes | 342/94 |
| 3,996,590 A * | 12/1976 | Hammack | 342/465 |
| 4,542,381 A * | 9/1985 | Wilhelm | 342/93 |
| 4,674,874 A * | 6/1987 | Halldorsson et al. | 356/141.1 |
| 4,952,939 A * | 8/1990 | Seed | 342/27 |
| 5,157,615 A * | 10/1992 | Brodegard et al. | 701/301 |
| 5,448,243 A * | 9/1995 | Bethke et al. | 342/59 |
| 5,473,331 A | 12/1995 | Kennedy et al. | |
| 5,508,706 A * | 4/1996 | Tsou et al. | 342/192 |
| 5,650,769 A * | 7/1997 | Campana, Jr. | 340/573.4 |
| 5,722,059 A * | 2/1998 | Campana, Jr. | 455/226.2 |
| 5,796,474 A * | 8/1998 | Squire et al. | 356/152.1 |
| 6,396,577 B1 * | 5/2002 | Ramstack | 356/141.1 |
| 6,717,543 B2 * | 4/2004 | Pappert et al. | 342/13 |
| 6,906,659 B1 * | 6/2005 | Ramstack | 342/54 |
| 7,248,210 B2 * | 7/2007 | Bruce et al. | 342/175 |
| 7,492,308 B2 * | 2/2009 | Benayahu et al. | 342/52 |
| 7,501,979 B1 * | 3/2009 | Guice et al. | 342/54 |
| 7,522,095 B1 * | 4/2009 | Wasiewicz et al. | 342/160 |
| 7,791,530 B2 * | 9/2010 | Puglia | 342/128 |
| 7,825,853 B2 * | 11/2010 | Bruce et al. | 342/175 |
| 7,864,103 B2 * | 1/2011 | Weber et al. | 342/123 |
| 7,876,260 B2 * | 1/2011 | Laufer | 342/61 |
| 8,223,065 B1 * | 7/2012 | Friesel | 342/95 |
| 8,547,275 B2 * | 10/2013 | Culkin et al. | 342/153 |
| 2006/0092075 A1 * | 5/2006 | Bruce et al. | 342/175 |
| 2008/0169968 A1 * | 7/2008 | Easthope et al. | 342/95 |
| 2012/0112949 A1 * | 5/2012 | Morgan | 342/22 |

OTHER PUBLICATIONS

International Search Report dated May 1, 2012 issued in PCT/KR2011/005614.

* cited by examiner

DETECTION AND TRACKING RADAR, ANTI HIGH SPEED MOBILE DEFENSE SYSTEM HAVING THE SAME AND HIGH SPEED MOBILE TRACKING METHOD OF DETECTION AND TRACKING RADAR

TECHNICAL FIELD

This specification relates to a detection and tracking radar capable of actively taking an action with respect to a threatening object to the ground weapon system.

BACKGROUND ART

Recently, development of antitank weapons, such as antitank missiles, rockets, antitank guns and the like, derives a remarkable enhancement of penetrabilities. Especially, as the antitank missile has rapidly been developed, it has a remarkably enhanced penetrability. Also, for a guided antitank missile, tendency is toward development from the conventional line-of-sight type to the fire-and-forget type by virtue of mounting an independent seeker.

As such, an active protection (defense) system, which can protect the ground weapon system from the threatening objects, is proposed. The active protection system is a field, which has been intensively researched and developed behind closed doors in various countries since the early 1990s for passengers survival rode in the ground weapon system. The active protection system is divided into soft-kill and hard-kill according to a mechanism of defending against a detected/tracked threatening object.

The soft-kill mechanism is to detect/track an approach of a threatening object at a long distance in advance so as to determine in a fast time whether or not to be threatened. Afterwards, a smoke shell is rapidly fired in the approaching direction of the threatening object to disable observation/aiming and self-guiding function of the threatening object, and simultaneously a tank may be fast moved into the smoke to protect the passengers' survival.

On the contrary, the hard-kill mechanism is to neutralize a threatening object directly by firing a counter-shell toward the threatening object.

According to the trend of the recent technology development, probability of avoiding the threatening object by the soft-kill is decreasing more and more.

Hence, a radar apparatus, which can be applied to the hard-kill, and has distinctiveness in the aspect of being mounted within a limited space like the ground weapon system and can rapidly/precisely detect and tract a variety of high speed targets approaching at a close range, may be considered.

DISCLOSURE OF INVENTION

Technical Problem

Therefore, an aspect of the detailed description is to rapidly detect a high speed mobile (moving target) threatening to a main body having a radar and track information related to the target.

Another aspect of the detailed description is to construct a defense system using a radar, capable of expanding each module constructing the radar.

Solution to Problem

To achieve these and other advantages and in accordance with the purpose of this specification, as embodied and broadly described herein, a detection and tracking radar may include a hazardous zone set within a preset radius based on a main body having a radar, a plurality of detection and tracking sectors configured to detect a high speed mobile approaching the main body within detection areas, the detection areas being defined by diving the hazardous zone based on an azimuth angle, and a controller configured to recognize the high speed mobile as a target based upon signals received from the detection and tracking sectors and track the target, wherein each of the detection and tracking sectors may include a transmit antenna unit and a transmitting unit configured to radiate a Continuous Wave (CW) or Linear Frequency Modulation (LFM) type waveform signal, a receive antenna unit and a receiving unit configured to receive the waveform signal reflected from the high speed mobile, wherein the transmit antenna unit, the receive antenna unit, the transmitting unit and the receiving unit may be integrally formed for each detection and tracking sector.

In accordance with one aspect, the transmitting unit may include a transmitter configured to generate the waveform signal, and a transmit switch configured to switch on or off transmission of the waveform signal with respect to each elevation angle section, defined by dividing an elevation angle into at least two elevation angle sections within each detection area.

In accordance with one aspect, the transmit antenna unit may include transmit antennas configured to radiate the waveform signal with respect to each of the divided elevation angle sections.

In accordance with one aspect, the receiving unit may include a receiver configured to amplify or convert a signal received from the receive antenna unit, and a receive switch configured to switch on or off an operation of each receive antenna constructing the receive antenna unit, in correspondence with the switching of the transmit switch.

In accordance with one aspect, the receive antenna unit may include a first antenna group and a second antenna group, configured to acquire information relating to movement of the high speed mobile in an elevation angle direction and information relating to movement of the high speed mobile in an azimuth angle direction, respectively, by receiving the waveform signal reflected from the high speed mobile.

In accordance with one aspect, each of the antenna groups may include a plurality of antennas disposed by being spaced apart from one another and configured to acquire information relating to movement of the high speed mobile in an elevation angle direction or an azimuth angle direction according to the principle of a radio interferometer system.

In accordance with one aspect, the controller may include a window module configured to generate burst data by multiplying a signal received from each detection and tracking sector by a preset window function, a frequency conversion module configured to perform a Fast Fourier Transformation (FFT) with respect to the burst data, a Constant False Alarm Rate (CFAR) module configured to detect a signal exceeding a preset threshold value, of signals input from the frequency conversion module, the threshold value set to have a specific false alarm rate, and a detection module configured to recognize the signal input from the CFAR module as a target high speed mobile when the signal input from the CFAR module meets a preset condition.

In accordance with one aspect, the controller may further include a tracking module configured to operate signals input from the detection module to extract movement information relating to the target high speed mobile when the detection module recognizes the target high speed mobile.

In accordance with one aspect, the controller may further include a coordinates conversion module configured to convert a coordinates system of a second detection and tracking sector into a coordinates system of a first detection and tracking sector for continuity of the movement information relating to the high speed mobile when the target high speed mobile moves from the first detection and tracking sector, in which the target high speed mobile has been recognized, into the second detection and tracking sector.

To achieve these and other advantages and in accordance with the purpose of this specification, as embodied and broadly described herein, a method for tracking a high speed mobile in a detection and tracking radar may include receiving a Continuous Wave (CW) or Linear Frequency Modulation (LFM) type reflection signal for each of detection and tracking sectors, divided in plurality, generating burst data by multiplying the received signal by a preset window function, generating a frequency conversion data by performing a Fast Fourier Transformation (FFT) with respect to the burst data, detecting data exceeding a preset threshold value from the frequency conversion data, the threshold value set to have a specific false alarm rate, and recognizing the detected data as a target when the detected data meets a preset condition.

In accordance with one aspect, the method may further include multiplying a preset function based upon signals input from the target high speed mobile, performing a frequency conversion and extracting movement information relating to the high speed mobile.

In accordance with one aspect, the method may further include converting a coordinates system of a second detection and tracking sector, adjacent to a first detection and tracking sector, into a coordinates system of the first detection and tracking sector for continuity of movement information relating to the high speed mobile.

To achieve these and other advantages and in accordance with the purpose of this specification, as embodied and broadly described herein, a high speed mobile defense system may include a main body, a hazardous zone defined within a preset radius based upon the main body, a plurality of detection and tracking sectors configured to detect a high speed mobile approaching the main body within detection areas, the detection areas being defined by diving the hazardous zone based on an azimuth angle, and a controller configured to recognize the high speed mobile as a target based upon signals received from the detection and tracking sectors and track the target, wherein the controller may include a coordinates conversion module configured to perform a coordinates conversion for continuity of movement information relating to the high speed mobile when the high speed mobile being tracked within a first detection area moves into an adjacent second detection area.

Advantageous Effects of Invention

In accordance with at least one exemplary embodiment, the detection and tracking radar can maintain continuity of a high speed mobile moving over a plurality of detection and tracking sectors, with extracting information relating to the high speed mobile independently for each of the detection and tracking sectors.

Also, a high speed mobile, which approaches a main body having a radar at a close range, can be rapidly detected and tracked and the detection and tracking sectors can be independently run, resulting in a free expansion of a radar system by virtue of addition of the detection and tracking sectors.

BEST MODE FOR CARRYING OUT THE INVENTION

Figure 1:
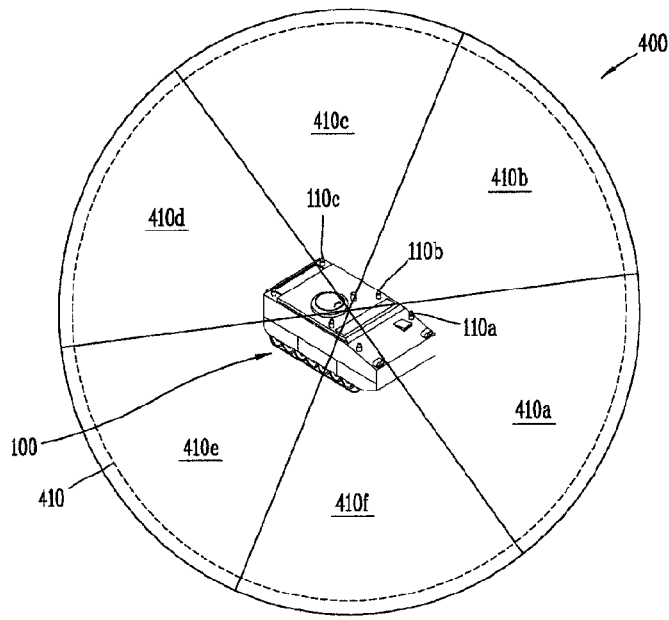
FIG. 1 is a schematic view showing a main body having an integral detection and tracking radar in accordance with one exemplary embodiment.

Description will now be given in detail of a portable terminal with reference to the accompanying drawings. Hereinafter, suffixes module and unit or portion for components used herein in description are merely provided only for facilitation of preparing this specification, and thus they are not granted a specific meaning or function.

This specification employs like/similar reference numerals for like/similar components irrespective of different embodiments, so they all will be understood by the first description. The expression in the singular form in this specification will cover the expression in the plural form unless otherwise indicated obviously from the context.

FIG. 1 is a schematic view showing a main body having an integral detection and tracking radar in accordance with one exemplary embodiment.

Figure 2:
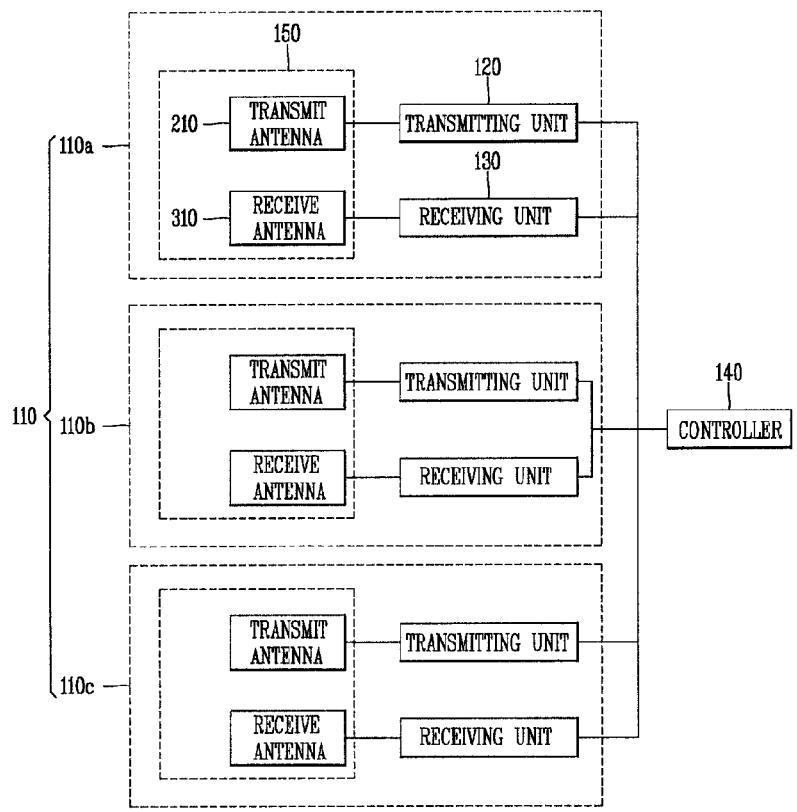
FIG. 2 is a block diagram of the integral detection and tracking radar in accordance with the one exemplary embodiment.

A detection and tracking radar in accordance with one exemplary embodiment may be mounted on a main body 100 and include a plurality of detection and tracking sectors 110 (e.g., 110a, 110b and 110c) and a controller 140 (see FIG. 2).

The main body 100 may exist on the ground, on the sea and in the air. The main body 100 may be a weapon system, which is threatened by missiles or the like.

A hazardous zone 400 may be set within a preset radius around the main body 100, and allow for detecting a high speed mobile (moving object) 500 approaching the main body 100, determining danger by tracking information relating to movement of the high speed mobile 500, and ensuring a time enough to prepare for the high speed mobile 500.

The hazardous zone 400 may be divided into a plurality of detection regions 410 (e.g., 410a to 410f) based upon an azimuth angle. That is, the detection regions 410 are defined by dividing the azimuth angle into preset angles. The detection and tracking sectors 110, each of which includes a transmit antenna unit 210, a receive antenna unit 310, a transmitting unit 120 and a receiving unit 130, all of which are integrally formed, may accordingly independently detect the movement of the high speed mobile 500 within each detection region 410.

FIG. 2 is a block diagram of an integral detection and tracking radar in accordance with one exemplary embodiment.

The detection and tracking radar may include a plurality of detection and tracking sectors 110. Each detection and tracking sector 110 may include a transmit antenna unit 210 and a transmitting unit 120, which are configured to radiate a Continuous Wave (CW) or Linear Frequency Modulation (LFM) type waveform signal, and a receive antenna unit 310 and a receiving unit 130, which are configured to receive the waveform signal reflected from the high speed mobile 500.

As such, the radar employs the CW-LFM radar system, which may extract distance and speed information relating to the high speed mobile 500 as follows.

A speed of a target is extracted in a CW section and distance and speed of the target is extracted in an LFM section. Distance information is estimated (predicted) in the CW section while distance information is extracted in the LFM section using information relating to the previous CW section, thereby causing an error therebetween. For improvement of accuracy, distance and speed information relating to a target is extracted using three waveforms as expressed by Equation 1 or 2.

When transmitting the current CW waveform via the transmit antenna unit 210, the target distance and speed information may be extracted according to Formula 1.

$$F_{CW} = 0.5 * F_{CW}^N + 0.5 * F_{CW}^{N-2}$$

$$F_{LFM} = F_{LFM}^{N-1}$$

$$V^N = 0.5 * c * F_{CW}/f_c$$

$$R^N = 0.5 * c * T * (F_{CW} - F_{LFM})/BW - V^n * T \quad \text{[Formula 1]}$$

where $F_{CW}^N$ denotes target bit information with respect to the current CW waveform, and $F_{CW}^{N-2}$ denotes target bit information with respect to the previous CW waveform. $V^N$ and $R^N$ denote current speed and distance information. c denotes speed of light. $f_c$ denotes a center frequency. T denotes a length of waveform, and BW denotes a modulation width of LFM waveform.

When transmitting the current LFM waveform via the transmit antenna unit 210, the target distance and speed information may be extracted according to Formula 2.

$$F_{LFM} = 0.5 * F_{LFM}^N + 0.5 * F_{LFM}^{N-2}$$

$$F_{CW} = F_{SW}^{N-1}$$

$$V^N = 0.5 * c * F_{CW}/f_c$$

$$R^N = 0.5 * c * T * (F_{CW} - F_{LFM})/BW - V^n * T \quad \text{[Formula 2]}$$

As such, since it is possible to calculate a distance N and a speed $R^N$ and $V^N$ of a target in a random beam direction, if the distance $R^N$ and the speed $V^N$ are sequentially calculated with performing beam radiation, information relating to orientation, distance and speed of the target may be extracted.

Figure 3:
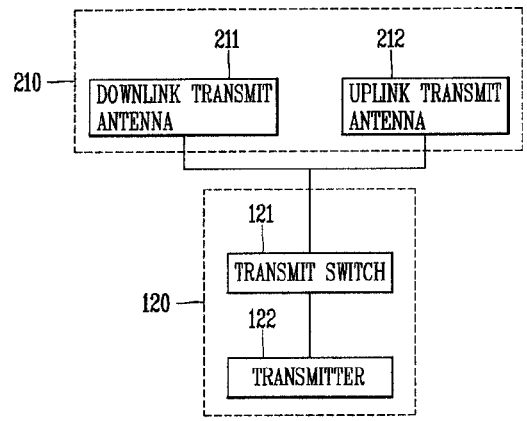
FIG. 3 is an overview of a transmit antenna unit and a transmitting unit shown in FIG. 2.
Figure 4:
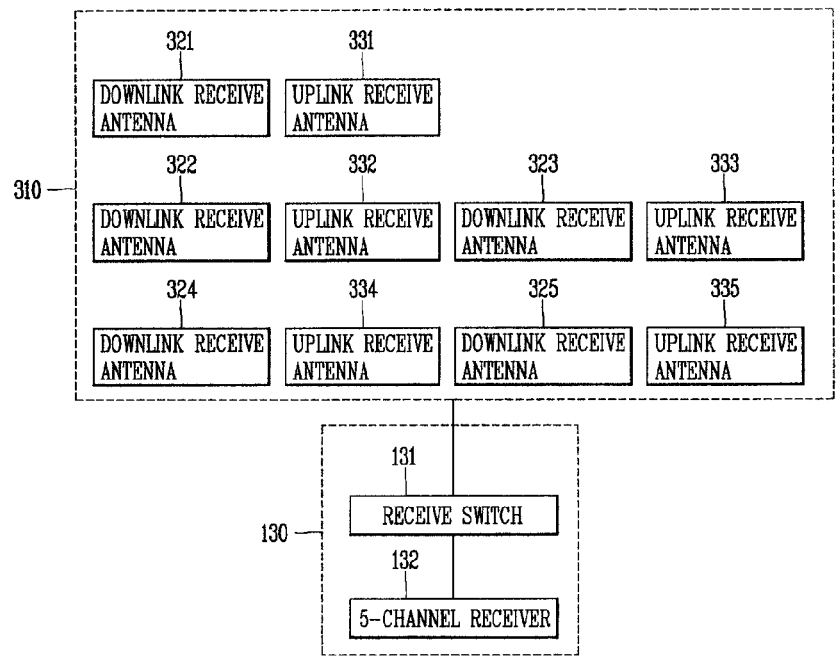
FIG. 4 is an overview of a receive antenna unit and a receiving unit shown in FIG. 2.

FIG. 3 is an overview of the transmit antenna unit 210 and the transmitting unit 120 of FIG. 2, and FIG. 4 is an overview of the receive antenna unit 310 and the receiving unit 130 of FIG. 2.

As shown in FIGS. 3 and 4, FIG. 3 shows the transmit antenna unit 210 and the transmitting unit 120 constructing one independent detection and tracking sector 110 and configured to radiate a CW or LFM type waveform signal.

The transmit antenna unit 210 may include an uplink transmit antenna 212 for performing an uplink radiation of a radar waveform signal and a downlink transmit antenna 211 for performing a downlink radiation of the radar waveform signal. Accordingly, the waveform signal may be radiated with respect to each divided elevation angle section, which will be explained later.

The transmitting unit 120 may include a transmitter 122 for generating a CW or LFM type waveform signal, and a transmit switch 121 for switching on or off transmission of the waveform signal with respect to each elevation angle section, which is defined by dividing an elevation angle into at least two elevation sections within the detection area.

The transmit switch 121 may allow selection of the uplink or downlink antenna for expansion of a detection/tracking area in an elevation angle direction.

FIG. 4 shows the receive antenna unit 310 and the receiving unit 130 constructing one independent detection and tracking sector 110.

The receiving unit 130 may include a receiver 132 for amplifying or converting a signal received from the receive antenna unit 310, and a receive switch 131 for switching on or off an operation of each receive antenna constructing the receive antenna unit 310, in correspondence with the switching of the transmit switch 121.

The receive antenna unit 310 may include a first antenna group and a second antenna group. The first and second antenna groups may be configured to acquire information relating to movement of the high speed mobile 500 in an elevation angle direction and information relating to movement of the high speed mobile 500 in an azimuth angle direction, respectively, by receiving the waveform signal reflected from the high speed mobile 500.

Here, the first antenna group may include uplink receive antennas for receiving radar reflection signals upon uplink transmission of the radar, and the second antenna group may include downlink receive antennas for receiving radar reflection signals upon downlink transmission of the radar.

Each of the antenna groups may include a plurality of antennas disposed with being spaced apart from one another so as to acquire information related to the movement of the high speed mobile 500 in the elevation angle direction or the azimuth angle direction according to the principle of a radio interferometer system.

Here, the transmit switch 121 of the transmitting unit 120 and the receive switch 131 of the receiving unit 130 may be controlled by the same signal, which allows uplink transmission and uplink reception for an uplink signal and downlink transmission and downlink reception for a downlink signal, thereby expanding a detection/tracking area in the elevation angle direction.

As one example, each antenna group may extract elevation angle information and azimuth angle information relating to a target according to the principle of the interferometer system using five receive antennas, and be provided with a 5-channel receiver 132 which is capable of simultaneously processing signals received by each receive antenna.

Here, in case of the downlink receive antennas, the elevation angle information relating to the target may be extracted by using downlink receive antennas (e.g., 321, 322 and 324) belonging to the first group antenna, and the azimuth angle information thereof may be extracted by using downlink receive antennas (e.g., 322, 323, 324 and 325) belonging to the second group antenna.

Upon the target detection, one of the receive antennas is set to determine presence or non-presence of the target and if the target is detected, a receiver connected to the rest four antennas may operate to track the target.

As another example, the receive antenna unit 310 may include a first antenna group (e.g., 331, 332, 333, 334 and 335) for receiving the waveform signal reflected from the high speed mobile 500 upon uplink transmission of the radar, and a second antenna group (e.g., 321, 322, 323, 324 and 325) for receiving the waveform signal reflected from the high speed mobile 500 upon downlink transmission of the radar. In this example, elevation angle information relating to a target may be extracted by using uplink receive antennas (e.g., 331, 332 and 334 upon receiving an uplink transmission signal, while being extracted by using downlink receive antennas (e.g., 321, 322 and 324) upon receiving a downlink transmission signal. Azimuth angle information relating to the target may be extracted by using the uplink receive antennas (e.g., 332, 333, 334 and 335) upon receiving the uplink transmission signal, while being extracted by using the downlink receive antennas (e.g., 322, 323, 324 and 325) upon receiving the downlink transmission signal.

Figure 5:
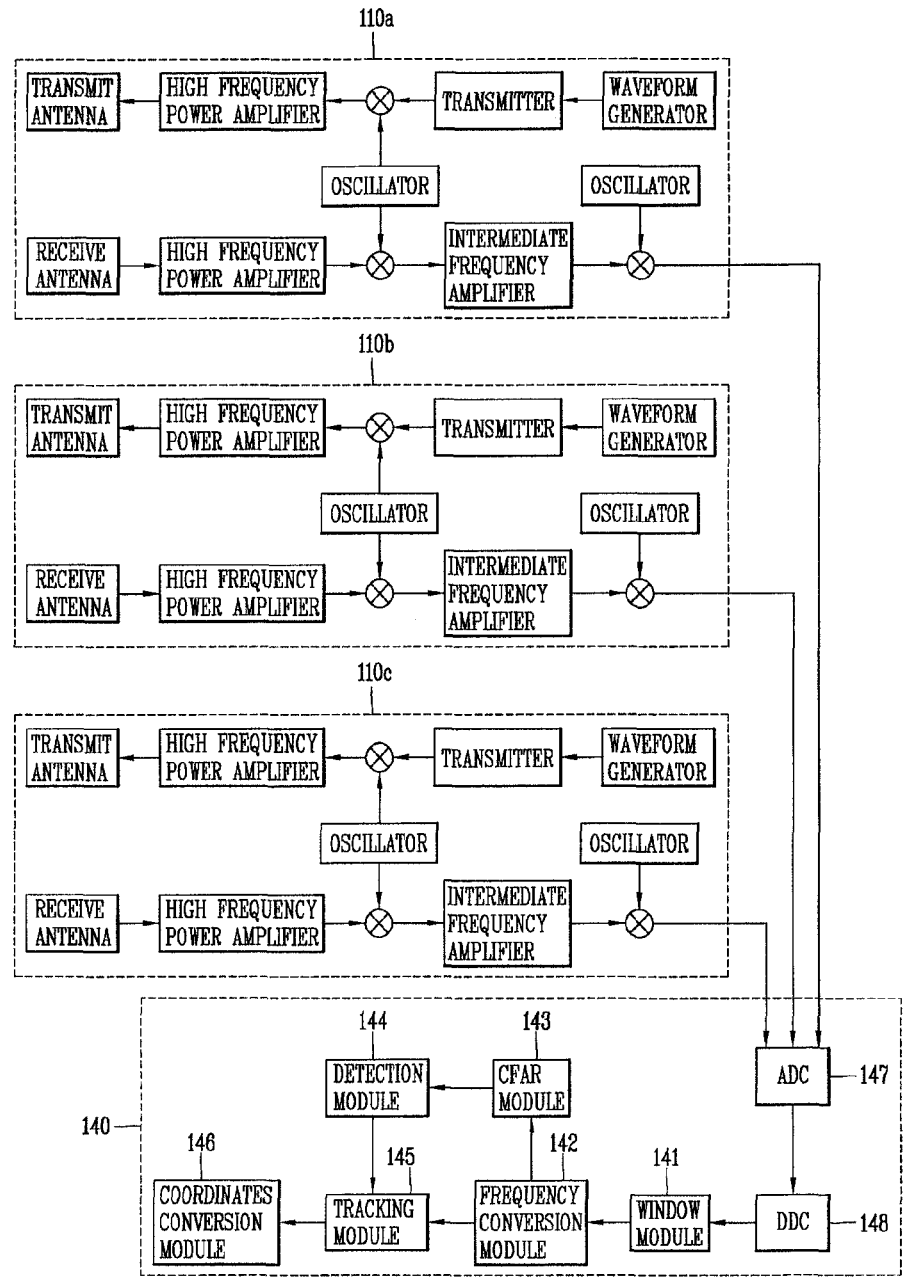
FIG. 5 is an overview of a controller shown in FIG. 2.

FIG. 5 is an overview of the controller 140 of FIG. 2. The controller 140 may control signals of the transmitting unit 120 and the receiving unit 130, determine presence of a target, and extract target related information.

The controller 140 may include a window module 141, a frequency conversion module 142, a Constant False Alarm Rate (CFAR) module 143 and a detection module 144.

The window module 141 may generate burst data by multiplying a signal received by each detection and tracking sector 110 by a preset window function. Examples of the window function may include Hamming, Hanning, Blackman, Gaussian and the like. Employment of a filter using such window function may allow lowering of a range sidelobe level by more than several tens of dB as compared to main beam, and reduction of an affection by a signal such as clutter.

The frequency conversion module 142 may perform a Fast Fourier Transformation (FFT) with respect to the burst data.

The CFAR module 143 may detect a signal exceeding a preset threshold value, which is set to have a specific false alarm rate, of signals input from the frequency conversion module 142.

When the signal input by the CFAR module 143 meets a preset condition, the detection module 144 may recognize it as the high speed mobile 500, which is the target.

The controller 140 may further include a tracking module 145. When the detection module 144 recognizes the target high speed mobile 500, the tracking module 145 may carry out an operation of signals input from the detection module 144 and thus extract movement information relating to the target high speed mobile 500.

The controller 140 may further include a coordinates conversion module 146. The coordinates conversion module 146 may convert a coordinates system of a second detection and tracking sector 110b into a coordinates system of a first detection and tracking sector 110a for continuity of the movement information relating to the target high speed mobile 500 when the target high speed mobile 500 moves to the second detection and tracking sector 110b, adjacent to the first detection and tracking sector 110a, in which the target high speed mobile 500 has been recognized.

Figure 6:
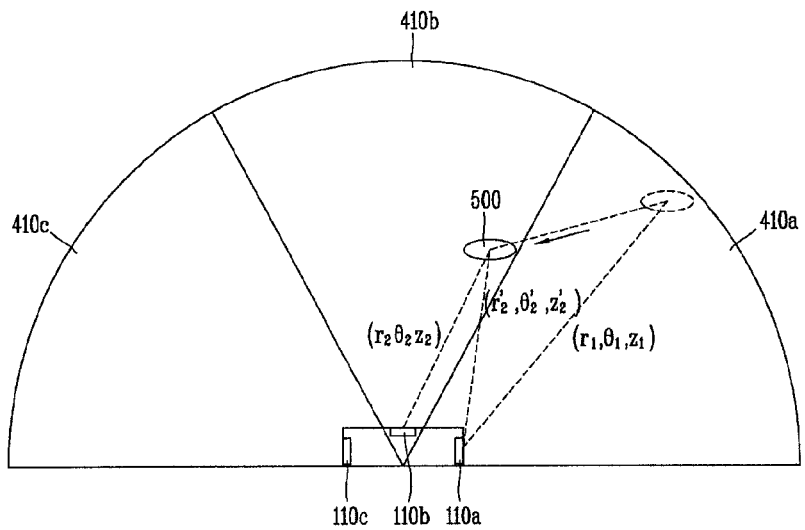
FIG. 6 is an overview showing a coordinates converting method in accordance with one exemplary embodiment.

FIG. 6 is an overview showing a coordinates conversion method in accordance with one exemplary embodiment.

For a high speed mobile 500, which has moved merely within the same detection and tracking sector 110a until tracking completion since detection is started, polar coordinates information relating to position and speed extracted within the sector 110a may be converted into orthogonal coordinates information of the detection and tracking radar for management. That is, a process may be carried out to convert the polar coordinates information relating to the position and the speed into the orthogonal coordinates information of the detection and tracking radar.

However, when the target high speed mobile 500 moves from the currently tracked sector 110a to another adjacent sector 110b, the information relating to the position and the speed of the high speed mobile 500 may be converted into polar coordinates of the initially detected sector 110a to maintain continuity of the target information. Accordingly, accuracy of the target information can be improved and succeeding direction and speed of the target can be predicted.

After the conversion, each information relating to the position and the speed of the target high speed mobile 500 may be converted back into the orthogonal coordinates information.

As shown, the high speed mobile 500, which has first been detected on first coordinates r1, θ1, z1 of the first detection area 410a moves to second coordinates r2, θ2, z2 of a second detection area 410b. The coordinates conversion module 146 converts the second coordinates r2, θ2, z2 into polar coordinates r2', θ2', z2' of the first detection area 410a by carrying out an operation.

Figure 7:
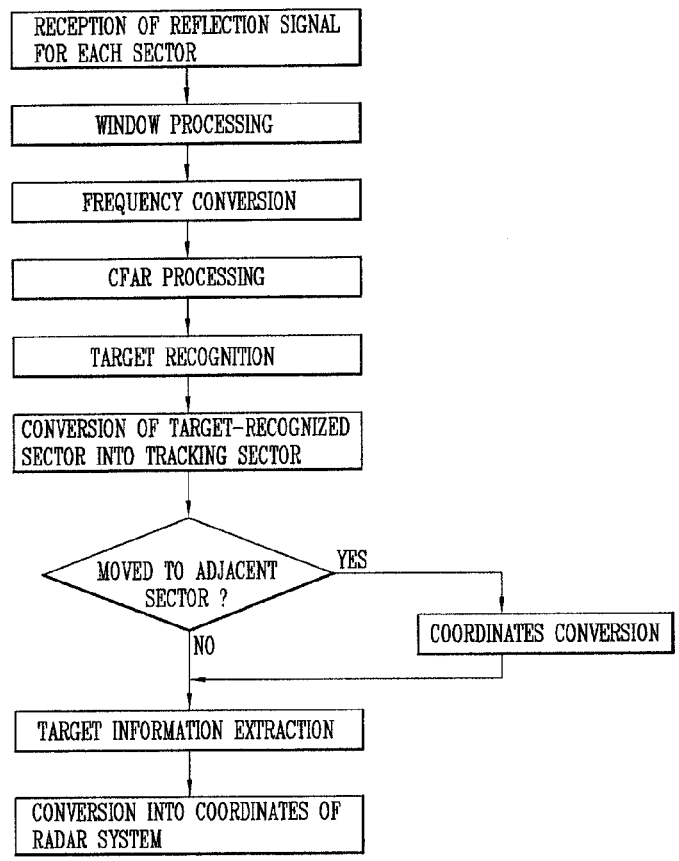
FIG. 7 is a flowchart showing a method for tracking target information in an integral detection and tracking radar in accordance with one exemplary embodiment.

FIG. 7 is a flowchart showing a method for tracking target information in an integral detection and tracking radar in accordance with one exemplary embodiment.

First, for a plurality of detection areas 410 divided, a transmit antenna radiates a CW or LFM type waveform signal for each detection and tracking sector 110. Accordingly, a receive antenna receives a signal reflected from the high speed mobile 500 present within the detection area 410.

The received signal is converted into a digital baseband signal by an A/D converter 147 (see FIG. 5) and a DDC 148 (see FIG. 5), and modulated into a preset signal.

Afterwards, the signal received through the process is multiplied by a preset window function, thereby generating burst data.

A FFT is carried out for the burst data to generate frequency conversion data. A CFAR process is performed to detect data exceeding a preset threshold value, which is set to have a specific false alarm rate, from the frequency conversion data.

Afterwards, when the detected data meets a preset condition, the system having the controller 140 recognizes it as a target.

The detection and tracking sector 110a, in which the target has been recognized, is switched into a tracking sector, thereby extracting information relating to movement azimuth angle, speed, position and the like from the high speed mobile 500. When the high speed mobile 500 moves into another adjacent detection and tracking sector 110b, the coordinates conversion module 146 converts coordinates related information, thereby maintaining information continuity.

The information relating to the target is continuously extracted and converted into system coordinates.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

INDUSTRIAL APPLICABILITY

Detection and tracking radar, anti high speed mobile defense system having the same and high speed mobile tracking method of detection and tracking radar may be industrially applicable.

The invention claimed is:

1. A detection and tracking radar comprising:
a hazardous zone set within a preset radius based on a main body having a radar;
a plurality of detection and tracking sectors configured to detect a high speed mobile approaching the main body within detection areas, the detection areas being defined by diving the hazardous zone based on an azimuth angle; and
a controller configured to recognize the high speed mobile as a target based upon signals received from the detection and tracking sectors and track the target,
wherein each of the detection and tracking sectors comprises:
a transmit antenna unit and a transmitting unit configured to radiate a Continuous Wave (CW) or Linear Frequency Modulation (LFM) type waveform signal; and
a receive antenna unit and a receiving unit configured to receive the waveform signal reflected from the high speed mobile,
wherein the transmit antenna unit, the receive antenna unit, the transmitting unit and the receiving unit are integrally formed for each detection and tracking sector,
wherein the controller comprises:
a window module configured to generate burst data by multiplying a signal received from each detection and tracking sector by a preset window function;
a frequency conversion module configured to perform a Fast Fourier Transformation (FFT) with respect to the burst data;
a Constant False Alarm Rate (CFAR) module configured to detect a signal exceeding a preset threshold value, of signals input from the frequency conversion module, the threshold value set to have a specific false alarm rate;
a detection module configured to recognize the signal input from the CFAR module as a target high speed mobile when the signal input from the CFAR module meets a preset condition; and
a coordinate conversion module, wherein when the target high speed mobile moves from a first detection and tracking sector, in which the target high speed mobile has been recognized, into a second detection and tracking sector, the coordinate conversion module is configured to convert a polar coordinate system of the second detection and tracking sector into a polar coordinate system of the first detection and tracking sector and subsequently convert the polar coordinate system of the first detection and tracking sector into an orthogonal coordinate system of the detection and tracking radar, for continuity of the movement information relating to the high speed mobile.

2. The radar of claim 1, wherein the transmitting unit comprises:
a transmitter configured to generate the waveform signal; and
a transmit switch configured to switch on or off transmission of the waveform signal with respect to each elevation angle section, defined by dividing an elevation angle into at least two elevation angle sections within each detection area.

3. The radar of claim 2, wherein the transmit antenna unit comprises transmit antennas configured to radiate the waveform signal with respect to each of the divided elevation angle sections.

4. The radar of claim 2, wherein the receiving unit comprises:
a receiver configured to amplify or convert a signal received from the receive antenna unit; and
a receive switch configured to switch on or off an operation of each receive antenna constructing the receive antenna unit, in correspondence with the switching of the transmit switch.

5. The radar of claim 4, wherein the receive antenna unit comprises:
a first antenna group and a second antenna group, configured to acquire information relating to movement of the high speed mobile in an elevation angle direction and information relating to movement of the high speed mobile in an azimuth angle direction, respectively, by receiving the waveform signal reflected from the high speed mobile.

6. The radar of claim 4, wherein the receive antenna unit comprises:
a first antenna group configured to receive the waveform signal reflected from the high speed mobile upon transmission of the waveform signal in a first direction; and
a second antenna group configured to receive the waveform signal reflected from the high speed mobile upon transmission of the waveform signal in a second direction, the second direction different from the first direction.

7. The radar of claim 5, wherein each of the antenna groups comprises a plurality of antennas disposed by being spaced apart from one another and configured to acquire information relating to movement of the high speed mobile in an elevation angle direction or an azimuth angle direction according to the principle of a radio interferometer system.

8. The radar of claim 1, wherein the controller further comprises a tracking module configured to operate signals input from the detection module to extract movement information relating to the target high speed mobile when the detection module recognizes the target high speed mobile.

9. A method for tracking a high speed mobile in a detection and tracking radar comprising:
receiving a Continuous Wave (CW) or Linear Frequency Modulation (LFM) type reflection signal for each of detection and tracking sectors, divided in plurality;
generating burst data by multiplying the received signal by a preset window function;
generating a frequency conversion data by performing a Fast Fourier Transformation (FFT) with respect to the burst data;
detecting data exceeding a preset threshold value from the frequency conversion data, the threshold value set to have a specific false alarm rate;
recognizing the detected data as a target when the detected data meets a preset condition; and
when the target high speed mobile moves from a first detection and tracking sector, in which the target high speed mobile has been recognized, into a second detection and tracking sector, converting a polar coordinate system of the second detection and tracking sector into a polar coordinate system of the first detection and tracking sector and subsequently converting the polar coordinate system of the first detection and tracking sector into an orthogonal coordinate system of the detection and tracking radar, for continuity of the movement information relating to the high speed mobile.

10. The method of claim 9, further comprising multiplying a preset function by signals input from the target high speed mobile, performing a frequency conversion and extracting movement information relating to the high speed mobile.

11. A high speed mobile defense system comprising:
a main body;
a hazardous zone defined within a preset radius based upon the main body;
a plurality of detection and tracking sectors configured to detect a high speed mobile approaching the main body within detection areas, the detection areas being defined by diving the hazardous zone based on an azimuth angle; and
a controller configured to recognize the high speed mobile as a target based upon signals received from the detection and tracking sectors and track the target,
wherein the controller comprises a coordinate conversion module, wherein when the target high speed mobile moves from a first detection and tracking sector, in which the target high speed mobile has been recognized, into a second detection and tracking sector, the coordinate conversion module is configured to convert a polar coordinate system of the second detection and tracking sector into a polar coordinate system of the first detection and tracking sector and subsequently convert the polar coordinate system of the first detection and tracking sector into an orthogonal coordinate system of the detection and tracking radar, for continuity of the movement information relating to the high speed mobile.

12. The radar of claim 6, wherein each of the antenna groups comprises a plurality of antennas disposed by being spaced apart from one another and configured to acquire information relating to movement of the high speed mobile in an elevation angle direction or an azimuth angle direction according to the principle of a radio interferometer system.

* * * * *